United States Patent [19]

Pieper

[11] 4,107,447
[45] Aug. 15, 1978

[54] ELECTRICAL GLASS MELTING FURNACE

[75] Inventor: Helmut Pieper, Lohr, Fed. Rep. of Germany

[73] Assignee: Sorg GmbH & Co. KG, Plochsbach, Fed. Rep. of Germany

[21] Appl. No.: 804,405

[22] Filed: Jun. 7, 1977

[51] Int. Cl.² .............................................. C03B 5/02
[52] U.S. Cl. ........................................................ 13/6
[58] Field of Search ........................................ 13/6, 23

[56] References Cited
U.S. PATENT DOCUMENTS

| | | | |
|---|---|---|---|
| 3,852,509 | 12/1974 | Rutledge et al. | 13/6 |
| 3,998,619 | 12/1976 | Cerutti et al. | 13/6 X |
| 4,025,713 | 5/1977 | Suesser et al. | 13/6 |

Primary Examiner—R. N. Envall, Jr.
Attorney, Agent, or Firm—Burgess, Dinklage & Sprung

[57] ABSTRACT

An electrical glass melting furnace having a refractory tank, wherein the batch glass is fed onto the surface of a bath of molten glass therein and refined glass is withdrawn from a lower portion thereof. Electric heating power is supplied, in the form of three-phase AC, through two levels of peripherally spaced electrodes. The secondary coils of the transformers employed each feed an electrode or electrode pair and the output of each secondary coil is additionally connected to the input of one of the other secondary coils in the system.

8 Claims, 4 Drawing Figures

UPPER LEVEL I

ELECTRICAL GLASS MELTING FURNACE

BACKGROUND

In electrically heated glass melting furnaces with multiple electrode levels, it is known to connect the electrodes of the uppermost level in such a manner that their current paths meet in the center of the furnace (U.S. Pat. No. 3,852,509). However, with this circuit arrangement, it has been found that the concentration of energy within the center of the furnace becomes excessive in the uppermost plane, and that an insufficient amount of energy is supplied to the furnace periphery. Cold spots can result between electrodes, particularly in the corners of hexagonal furnace walls. In such cold spots, the not yet molten glass batch or unrefined molten glass might descend to the furnace bottom. Furthermore, control is difficult to maintain with this circuit arrangement because the power inputs for the various levels of electrodes are matched to each other so as to be controllable simultaneously and in the same sense only.

SUMMARY

The present invention provides a glass melting furnace and circuit arrangement, wherein uniform distribution of power throughout all levels of the furnace is obtained, cold spots and cold corners are avoided, and the control of the separate planes or levels may be effected independently. The power exchange taking place between the various levels, despite the electrical separation or insulation of the transformers employed for such levels, is reduced to a minimum.

The present furnace may be used not only for a specific type of glass, but rather for every known type of glass, thereby providing an improved quality of the glass with higher efficiency. Furthermore, the structure and particularly the control of the furnace according to the present invention is simple and reliable, involving an equalization of the current flow within the groups of electrodes.

The present invention provides an electrical glass melting furnace having refractory tank means wherein batch glass is fed to the surface of a bath of molten glass therein and refined glass is withdrawn from the lower portion thereof, comprising:

(i) at least two superposed levels of an integral multiple of nine electrode means extending into the molten glass and spaced around the periphery of the tank means; the uppermost level and the level therebelow each having sets of integral multiples of three electrodes with each set defining a current path not encompassing the center line;

(ii) a three-phase transformer means for each level, each having primary coil means and three secondary coil means, said primary coil means being connected to a source of three-phase AC;

(iii) said secondary coil means each being connected to one set of electrode means to provide both intraphase peripheral and cross firing current paths within each set of electrode means.

Advantageously, electrode pairs are provided in the uppermost level to reduce the current density and to increase the width of the spring points formed within the glass mass.

In order to achieve a simple construction of the furnace and at the same time to avoid cold spots within the corners, the furnace wall preferably has a hexagonal configuration with rounded corners, with an electrode or dual electrode being installed obliquely adjacent each corner such that the tip of the electrode or dual electrode extends into the corner.

In order to obtain a most favorable power distribution electrodes are positioned, preferably in opposing relation substantially centrally in the wall of the tank, which electrodes are connected to the secondary sides of the same set of transformers and between which a primary current flow takes place.

The invention also provides a method for electrically heating a glass melting furnace having refractory tank having a vertical center line and wherein batch glass is fed to the surface of a bath of molten glass therein and refined glass is withdrawn from the lower portion thereof, comprising:

(i) providing at least two superposed levels of an integral multiple of nine electrodes extending into the molten glass and spaced around the periphery of the tank and dividing electrodes of the uppermost level and the level therebelow each into sets of integral multiples of three electrodes each defining a current path not encompassing the center line;

(ii) providing a three-phase transformer for each level and each having a primary coil connected to a source of three phase AC and three secondary coils;

(iii) connecting each secondary coil to one set of electrodes to effect both intraphase peripheral and cross-firing current paths within each set.

DESCRIPTION OF THE DRAWING

In the following, an exemplary embodiment of the present invention is described in greater detail by referring to the enclosed drawings, wherein:

FIG. 1a is a top plan view of the upper level of electrodes of a furnace according to the invention, while

DESCRIPTION

The glass melting furnace of the invention includes a refractor tank and a supporting steel frame therearound (not shown), a conventional batch feeder and an arched roof (not shown) are provided, and the bottom of the furnace has an outlet or (discharge opening) for withdrawing molten glass. The basic structure of the furnace corresponds to conventional, fully electrically heated glass melting furnaces for example as shown in U.S. Pat. No. 3,742,111 issued June 26, 1973.

The interior of the furnace has two planes or levels of electrodes E, designated I for the top level and II for the lower level. The upper level I includes nine dual or paired electrodes, with the electrodes of one pair being interconnected. Thus, in electrical respects nine electrode positions are connected to three three-phase AC circuits.

The second level II includes nine electrodes such that the second level likewise has nine positions similarly connected to three three-phase AC circuits.

Three sets of dual electrodes of level I and three sets of electrodes of level II are each mounted near the corners of the hexagonal configuration of the furnace so as to extend obliquely into the corners, said electrodes ensuring by their release of energy or power that a descending cold flow is prevented from occurring in the corner positions. In this arrangement, the electrodes in levels I and II are mutually staggered in such a way that the electrodes of adjacent corners are each positioned at different levels. Furthermore, the electrodes of lower level II have their tips or front ends each positioned centrally of the gaps between the tips of the electrodes in upper level I.

Additionally, the present furnace includes two transformers each having three primary coils thereof connected to phases R, S, T of a three-phase AC power supply.

Figure 1A:
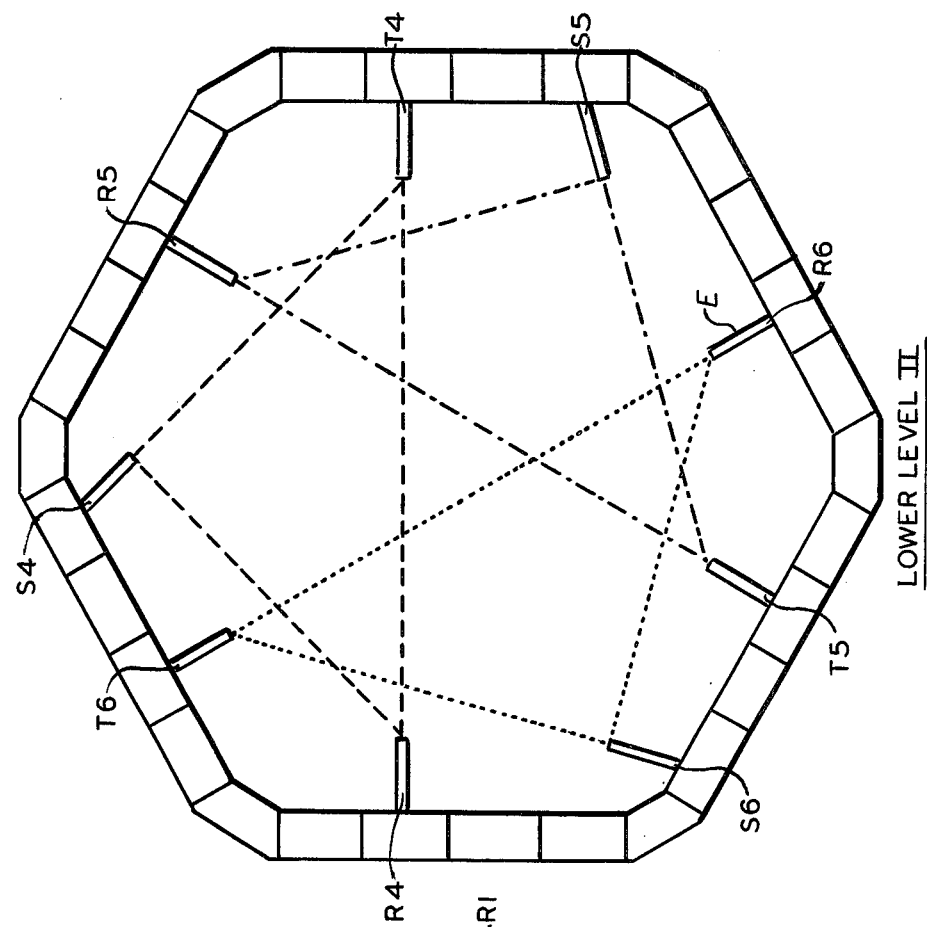
Figure 1B:
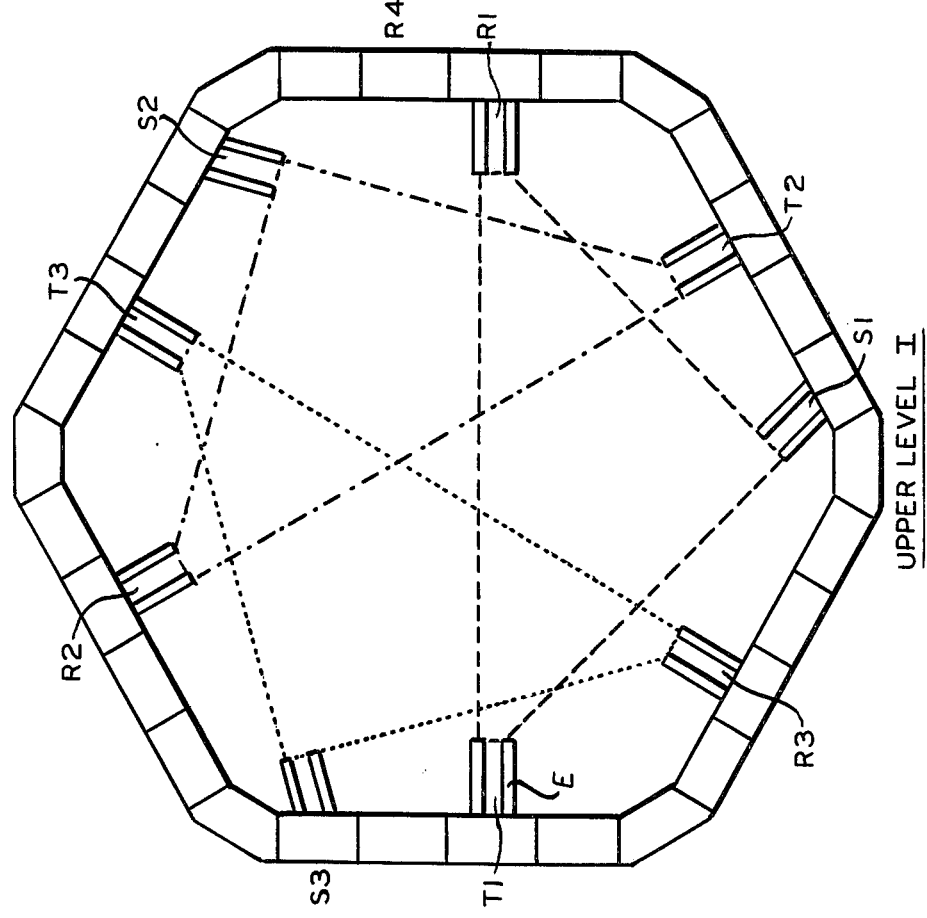
FIG. 1b is a similar top plan view of the next below level of electrodes.
Figure 2:
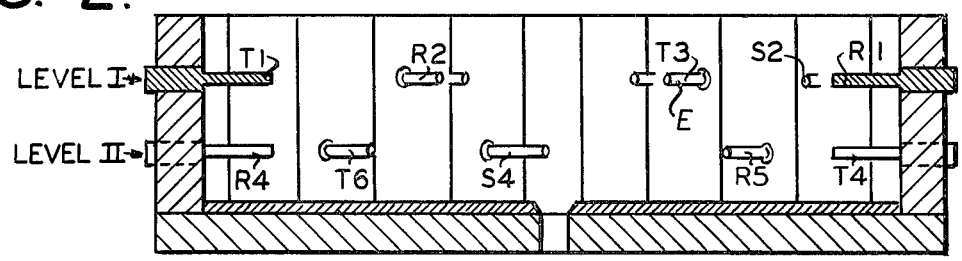
FIG. 2 is a vertical sectional view of the furnace according to FIG. 1.
Figure 3:
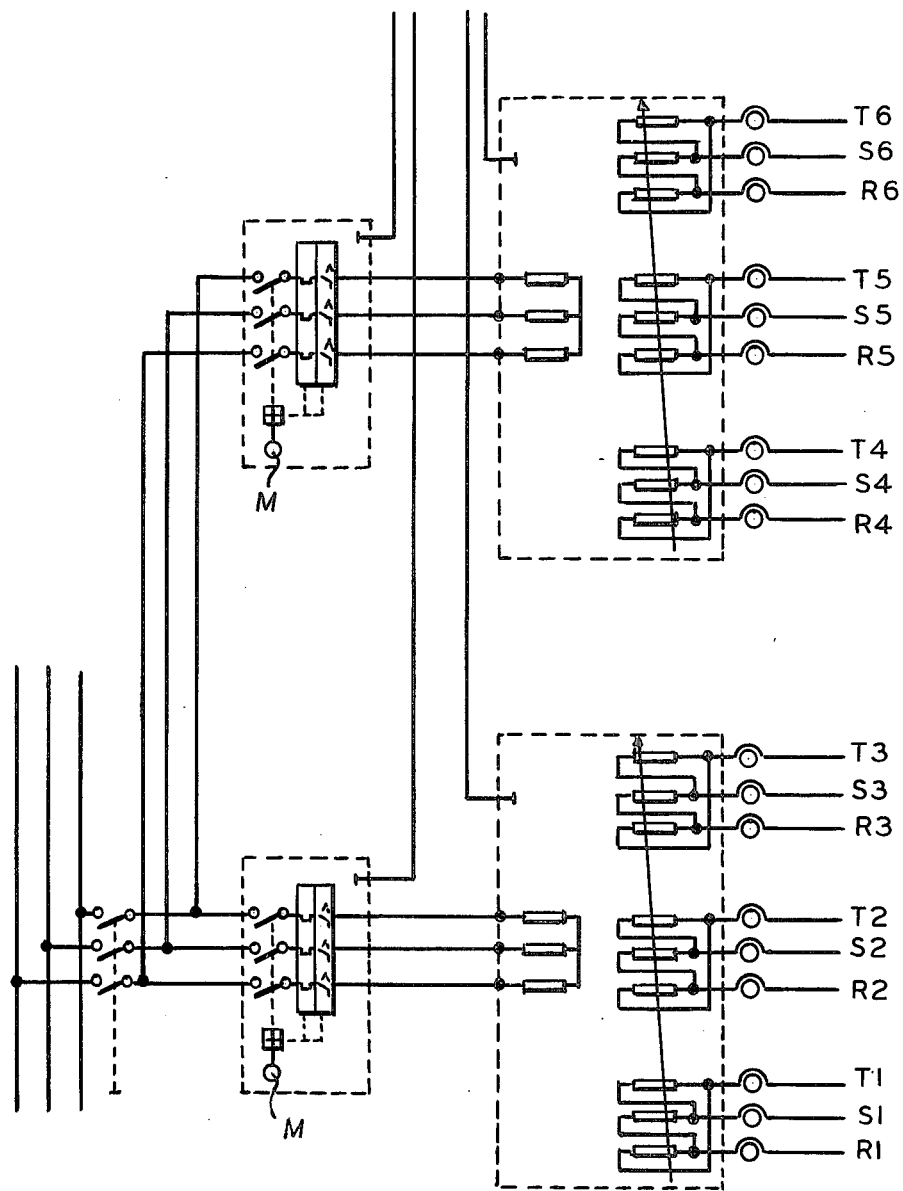
FIG. 3 is a circuit diagram for a furnace according to the present invention.

The secondary sides of the transformers are each divided into three sets or groups of three secondary coils each, with each set of coils forming a three-phase AC circuit. As shown in FIG. 3, the output of each secondary coil is connected to an electrode, and the secondary coils are connected in such a fashion that the input of each coil is applied to the output of another coil of the same set; this means that a delta connection exists between the electrodes connected to the coils.

As indicated by the arrow penetrating the secondary coils in FIG. 3, the three sets of coils are each adapted to be controlled in common. It has also been found that each set of coils may be controlled separately; due to the perfect symmetrical load distribution or division obtained with the present furnace; however, common control has proved to be adequate. The uniformity of the load distribution in this structure involves not only the individual transformers, but, against all expectation, also the separate phases of the individual transformers. Because of this load distribution, the interaction between the separate levels is extremely low.

The connection is implemented in a manner that one transformer supplies electric power or energy to the three circuits of the uppermost level, while the other transformer feeds the three circuits of the second level.

As shown in the drawing, the electrodes are arranged with substantially equal spacing within the extension of a linear wall portion of the refractory tank, and identical phases may be positioned side by side within a single level (not shown). More specifically, the sequence R, S, T of the phases of the electrodes positioned in levels I and II can be determined by considering them in a counterclockwise direction, wherein electrodes of both levels are alternatingly arranged as considered from an electrical point of view.

The electrodes installed into the present furnace may be supplemented by auxiliary and starting electrodes (not shown) as well as by further auxiliary electrodes interiorly of the outlet and the riser in order to avoid an excessive drop in the temperature of the refined molten glass discharged from the tank.

In order to eliminate cold spots within the corners, the furnace has rounded walls in the corners, and in order to provide for optimum power distribution, electrodes of the same circuit are installed into opposite walls substantially in the center of these walls, which electrodes are therefore connected to the secondary sides of the same set of transformers and which, thus, carry a high primary current flow between them.

Because of the fact that every third electrode of a transformer set or group is arranged in the corner between the two first-mentioned electrodes, triangles of current flow are formed in both corners, with each triangle having one apex positioned in the spatial furnace corner and one side thereof extending nearly through the center of the furnace. As the other two sides of the triangle extend almost in parallel with the wall, a particularly high power density is produced at the walls and in the center, whereby a substantially uniform energy or power distribution across the full cross-section of the furnace is obtained. In this regard, it should be noted that the illustrated current paths have to be considered as forming three-dimensional streamlined beams of spindle-shaped configuration the outlines of which overlap each other.

As should be apparent, the invention provides, with the use of most simple electrical means, a substantial improvement of the power distribution or division and of the controllability of electrically heated glass melting furnaces, and it therefore can be said to be an ideal solution to existing problems.

What is claimed is:

1. Electrical glass melting furnace having refractory tank means having a vertical center line wherein batch glass is fed to the surface of a bath of molten glass therein and refined glass is withdrawn from the lower portion thereof, comprising:
    (i) at least two superposed levels of an integral multiple of nine electrode means extending into the molten glass and spaced around the periphery of the tank means; the uppermost level and the level therebelow each having sets of integral multiples of three electrodes with each set defining a current path not encompassing the center line;
    (ii) a three-phase transformer means for each level, each having primary coil means and three secondary coil means, said primary coil means being connected to a source of three-phase AC;
    (iii) said secondary coil means each being connected to one set of electrode means to provide both intraphase peripheral and cross firing current paths within each set of electrode means.

2. Glass melting furnace of claim 1 wherein substantially equal spacings are maintained between the innermost ends of the electrode means within each level, with the tips of said electrode means of the lower level being positioned within the gaps between the electrode tips of the upper level.

3. Glass melting furnace of claim 2 wherein the upper level of electrode means comprise interconnected electrode pairs.

4. Glass melting furnace of claim 2, wherein the corners of the tank means are rounded and the electrode means are mounted obliquely near said corners to extend into the region of the corners, the electrode means of adjacent corners being positioned at different levels.

5. Glass melting furnace of claim 1 wherein electrode means are mounted in opposing fashion substantially centrally of the wall of the tank means, said electrode means being connected to the secondary coil means of the same transformer means between which a primary current flow takes place.

6. Glass melting furnace of claim 1 wherein the two levels of electrode means, as seen vertically, are arranged in alternating fashion, and wherein the three phases of AC current are connected side-by-side within a respective level.

7. Glass melting furnace of claim 1 wherein said primary coil means each control nine secondary coil means.

8. A method for electrically heating a glass melting furnace having refractory tank having a vertical center line and wherein batch glass is fed to the surface of a bath of molten glass therein and refined glass is withdrawn from the lower portion thereof, comprising:

(i) providing at least two superposed levels of an integral multiple of nine electrode means extending into the molten glass and spaced around the periphery of the tank and dividing electrodes of the uppermost level and the level therebelow each into sets of integral multiples of three electrodes each defining a current path not encompassing the center line;

(ii) providing a three-phase transformer for each level and each having a primary coil connected to a source of three phase AC and three secondary coils;

(iii) connecting each secondary coil to one set of electrodes to effect both intraphase peripheral and cross firing current paths within each set.

* * * * *